Sept. 21, 1965    F. STEINER    3,207,121
ANALOGUE INDICATING DEVICE
Filed Aug. 6, 1962    3 Sheets-Sheet 1
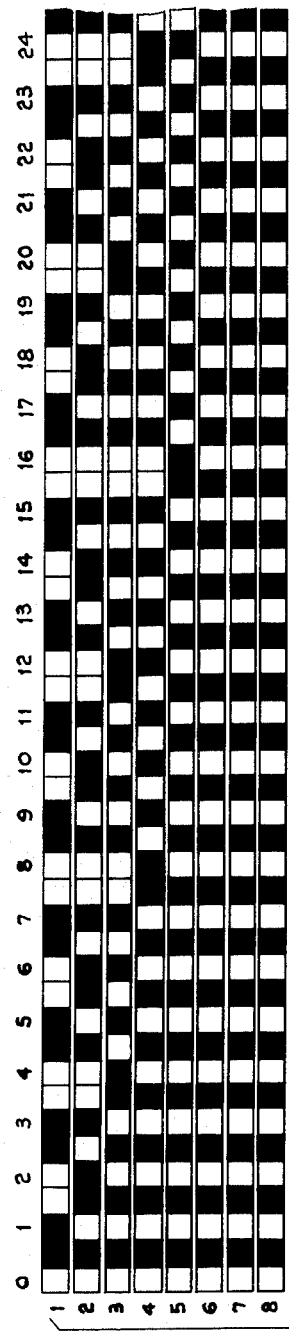
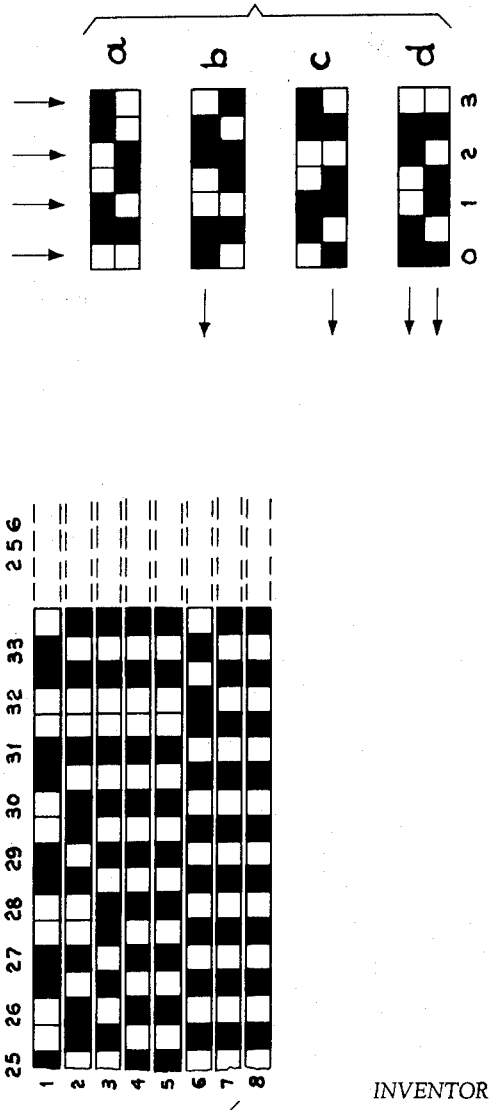
INVENTOR.
FRITZ STEINER
BY
ATTORNEY Sept. 21, 1965  F. STEINER  3,207,121

ANALOGUE INDICATING DEVICE

Filed Aug. 6, 1962  3 Sheets-Sheet 2

INVENTOR.
FRITZ STEINER
BY
ATTORNEY

Sept. 21, 1965 F. STEINER 3,207,121
ANALOGUE INDICATING DEVICE
Filed Aug. 6, 1962 3 Sheets-Sheet 3
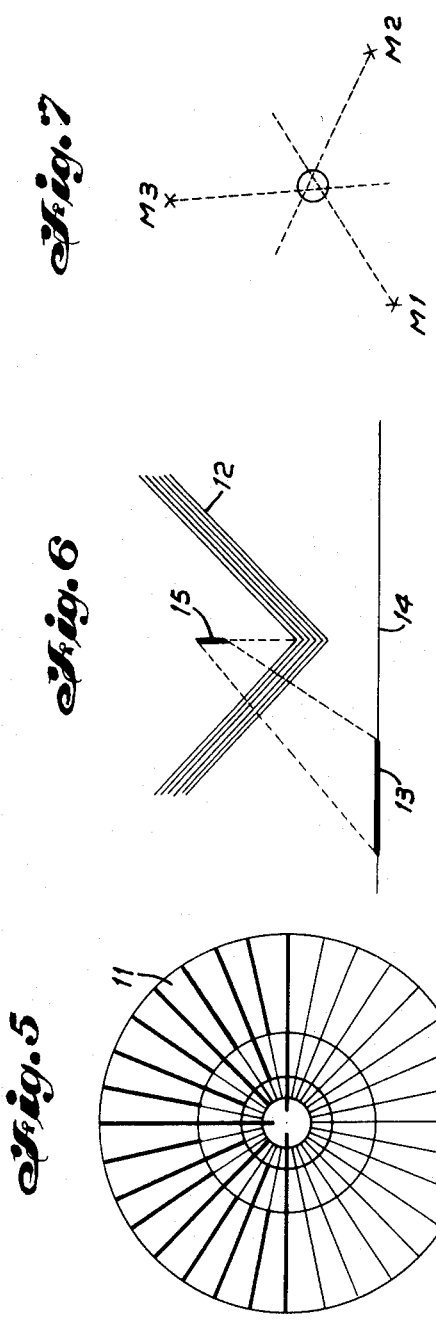
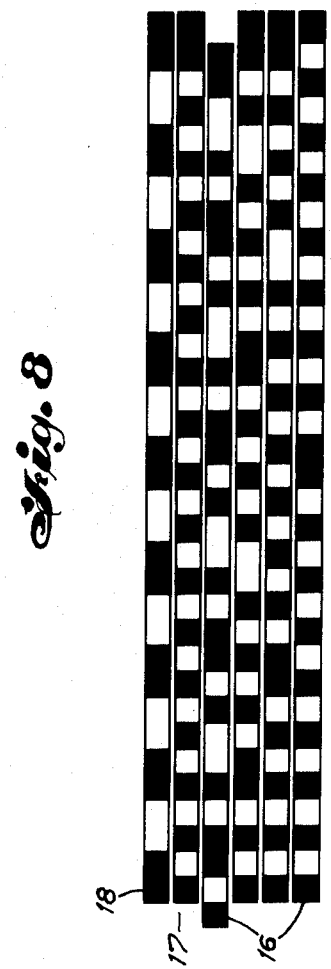
INVENTOR.
FRITZ STEINER
BY
ATTORNEY

United States Patent Office 3,207,121
Patented Sept. 21, 1965

3,207,121
ANALOGUE INDICATING DEVICE
Fritz Steiner, Pforzheim, Germany, assignor to International Standard Electric Corporation, New York, N.Y., a corporation of Delaware
Filed Aug. 6, 1962, Ser. No. 214,880
Claims priority, application Germany, Aug. 16, 1961
St 18,212
4 Claims. (Cl. 116—18)

This invention relates to an analog indicating device useful in air traffic control display systems for providing a visual display of the position of a mobile craft in a given area.

Due to the tremendous increase in air travel in the last few years many problems relating to the control of air traffic have been created in the aircraft industry. One of the areas in which considerable research has been done is in the development of a suitable system for displaying pictorially a moving vehicle in the air traffic control center, where commands as to landing and take-off are communicated to the pilots in the various crafts. Various proposals have been made in connection with the development of a system to produce simulated movement of the position, direction and identification of aircraft in pictorial form on a screen of relatively large dimensions. But these earlier systems proved to be rather complex and expensive and to have a poor response time for indicating the received signals from the craft.

In certain types of aircraft control systems it is conventional to display on the screen of a cathode ray tube a trace indicating the bearing of an aircraft with respect to a particular ground station. It should be noted, however, that in order to obtain real utility in the pictorial display it should be considerably larger than that obtainable on a cathode ray screen. Furthermore, in order to obtain an accurate position "fix" of the craft, it is also necessary to perform a triangulation wherein the respective traces representing the bearing of the craft with respect to differently located ground stations are produced, so that the intersection of these traces will give the position of the craft. In order to perform the triangulation it has hitherto been the practice either to provide a separate cathode ray tube for each trace and to combine the traces on the respective tubes optically; or else provide an electronic commutating arrangement enabling the traces to be displayed in turn on the screen of a single tube at a rate sufficient for the persistance of vision to enable the traces to appear to be simultaneous.

The first of the methods involves the use of individual projection tubes, optical mirrors, cathode ray tubes which result in a system that is somewhat cumbersome, inconvenient and not economically adapted to the provision of multiple displays. The second method contains practical difficulties as to size and cost of equipment and is limited as regards the number of separate traces which can be accommodated on a tube.

In addition, the problem of obtaining adequate brilliance and persistance is very difficult to solve in connection with cathode ray tube displays. Such cathode ray tube displays also contain a considerable number of extraneous indications such as dots and streaks from which only an experienced operator can determine the true bearing indications.

Furthermore, in certain traffic control systems the code converting equipment, which converts the bearing information into a code suitable for transmission, is rather complex and costly to manufacture.

Decoding arrangements have been developed wherein the bearing information is read directly in the desired code without employing a code converting device. The reading scale in these arrangements is usually calibrated in accordance with the selected code and is scanned with photoelectric cells to obtain a train of pulses characterizing the measured bearing information. Upon transmission of the information, the encoded values have to be decoded again at the receiving station in order to carry out either a visible or printed indication. In these arrangements, it is also necessary to convert the coded values in a decoding device into the code assigned to the visible indicating values before the indication is carried out.

In connection with air traffic control systems, another problem exists when many aircraft are flying over the control area simultaneously. The length of time during which signals corresponding to a particular "fix" may greatly vary from several seconds to a small fraction of a second. Under these circumstances it must be realized that the response time of the indicating system must be as small as possible, preferably of the order of a fraction of a second and that the brightness of the display must be great enough to provide legible indications under these conditions.

In British Patent 832,670 there is disclosed an indicating device capable of effecting a direct analog indication of values received in a digital (binary) fashion which is particularly adapted to the indication of direction-finding data. There are provided several slotted discs respectively capable of assuming two positions (0 and 1). The slots are in such a way arranged in the discs that for each individual position of the discs all of the slots are in agreement at one point only, thus accomplishing the indication. The arrangement of the slots, therefore, is made in such a way that in the indicating fields of the individual discs there are represented the code columns, and in the indicating fields of same number of all discs there are represented the code lines of the code panel. The indication is then effected in that particular indicating field for which the code of the set discs corresponds to the code impressed in the normal condition upon the indicating fields of same number of all discs characterizing the value to be indicated.

In a patent application for "Air Traffic Display System" by Andre Sunnen filed in the U.S. Patent Office on December 29, 1960, and bearing Serial Number 79,354, now Patent No. 3,094,698 there is disclosed a device utilizing the analog indication of digital values disclosed in the German application.

An object of the present invention is the provision of an improved indicating device which uses an analog indication of digital values.

Another object is the provision of an improved air traffic indicating system utilizing the improved indicating device for displaying mobile craft about a given area such as the vicinity of an airport.

A feature of this invention is a code disc wherein the disc is subdivided into concentric parts or zones the width of which decreases from the circumference towards the center in the order of the integer power of 2, and to provide slots in the $m$th zone only to a scope corresponding to a code with $(n-m+1)$ digits.

The above mentioned and other features and objects of this invention and the manner of attaining them will become more apparent and the invention itself will be best understood by reference to the following description of an embodiment of the invention taken in conjunction with the accompanying drawings, in which:

FIG. 1 shows the development of slotted discs which are arranged behind each other for the direct indicating device of this invention;

FIG. 2a–2d shows an indicating device comprising two slotted discs;

FIG. 5 shows a code disc in which the slots are made according to the invention;

FIG. 6 represents a reverse cone-shaped code disc to obtain large lines;

FIG. 7 is the arrangement of three indicating devices with reverse cone-shaped code discs for triangulation, and FIG. 8 shows an indicating arrangement with an additional code disc according to a further development of this invention.

Figure 3:
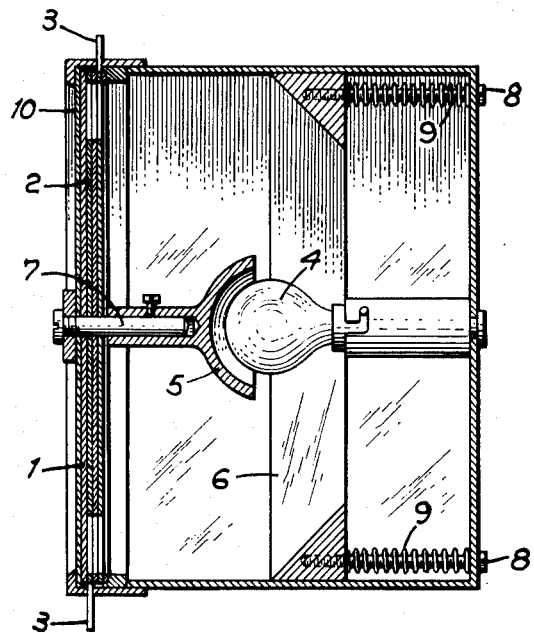
FIG. 3 shows a direct optical indicating device with built-in slotted discs in a selectional view.

The angle values which are read as binary numbers are supposed to be directly optically indicated by the novel indicating device. The indication of the values is accomplished by the opening and closing of the slots contained in a slotted disc. To this end there is assigned to the one of the binary quantities, which is used for the control purpose, the function "opening" and to the other one the function "closing." Accordingly, two values may be represented with the aid of one disc. To every further position of a binary number there is now likewise assigned a slotted disc comprising two positions. In the case of $n$ discs it will then be possible by means of the different mutual combinations of the actuated or non-actuated discs respectively, to represent $2^n$ values. In FIG. 1 there are shown eight slotted discs arranged behind each other, and which are thus capable of representing 256 different values. For the controlling of the slotted discs there is respectively required an 8-digit binary number. In the given example there is shown in the slot-strap or strap-slot combinations respectively, of all discs the code panel of the normal binary code, that is, there will result for all discs and the same numbers of indicating field the code lines, and for the individual discs the code columns, in which case the first disc will include the first column as counted from the rear, the second disc the second column, etc. The slots are marked in the drawing by the white square sections, and the straps are marked by the black sections. Furthermore the slot-strap combination is supposed to be a binary 0, and the strap-slot combination is supposed to be a binary 1. It will be easily recognized that for instance, when displacing the first disc by the width of one slot towards the left there will exist in the second field a through-passage through all discs. This will correspond to the value 1. When denoting the normal position of all discs by 0 and the drawn position by 1, then, in the present case the discs will be in the position 00000001, i.e., that means, that in this case there is indicated the figure 1, because there will be obtained an indication for that particular indicating field for which there exists a coincidence of the set discs with the thereupon impressed code. Because this particular indicating field will represent in the normal position of the discs the code 00000001.

In FIG. 2, for the purpose of enabling a better understanding of the invention, there may be assumed the simple case of employing two dics only, in other words, that it will only be possible to indicate four different values. In FIG. 2a the discs are in the normal position 00, so that an indication is possible for the positional value 0. Upon drawing the upper disc (FIG. 2b), which corresponds to a disc position 01, there will be obtained a through passage for the indicating field 01 of the discs in the normal position, i.e., due to the employed code, for the value 1. FIG. 2c shows the representation of the value 2 by displacing the lower panel (position 10), and FIG. 2d shows the representation of the value by displacing both panels into the position 11.

This arrangement is especially suitable for the indication of angle values, which are given as binary numbers. The circular scale or the divided or graduated circle may be chosen at will, so that quite depending on the required accuracy there may be determined the number of positions of the binary number and, consequently, the number of discs. The diameter of the circular discs may be chosen at will and is only determined by the width of the slots. The outer shape of the indicating device may easily be adapted to the given requirements.

In FIG. 3 there is shown a sectional view of an angle indicating device. The circular scale is chosen as 256 so that accordingly, there are required eight moving circular discs. In addition thereto a ninth immovable disc 1 is required with a uniform division or graduation for serving as a cover disc. The eight movable discs 2 are provided with the slot-strap or strap-slot combination respectively, in accordance with the scheme as shown in FIG. 1.

Figure 4:
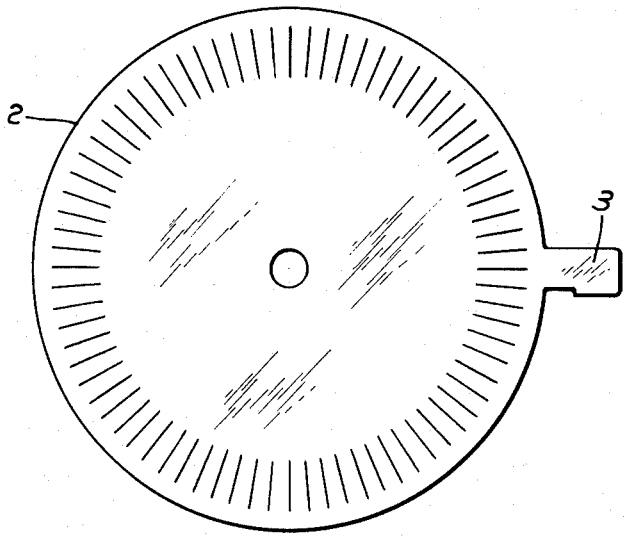
FIG. 4 shows an indicating disc with the indicating fields resulting in the representation of angle values.

The setting of the discs is accomplished with some sort of suitable power source, e.g. with plunger type armature magnets. To this end the discs 2 are provided with flaps 3 (FIG. 4). These flaps 3 are are led out for constructional reasons in a manner cyclically staggered by 180°. The setting way for the discs is determined by the length of the guiding slots for the flaps. The angles are indicated in the device as luminous dashes. The illumination of the slots is effected by a light source 4 via a concave reflector 5 and a ring-type reflector 6. The concave reflector 5 is mounted to the centering shaft 7 for the slotted discs and is capable of being horizontally displaced. The ring-type reflector 6 may be varied in its horizontal position by means of the four adjusting screws 8 and the associating spiral springs 9, also serving the mounting of the reflector. The disc 10 arranged in front of the slotted discs is provided with a scale or graduation containing a display of the angle values and, in addition thereto, serves as a dust protection for the device.

Instead of the described slot arrangements there may also be provided semi-circles rotating about a common axis, with slot-strap or strap-slot combinations, so that there will be obtained a 180°—scale as is used, for instance, in voltmeters. The arrangement is in no way limited to the representation of angle values, but all kinds of values occurring in a binary code, e.g. voltages, currents, temperatures, speeds, lengths, etc. may be directly indicated when correspondingly designing the slotted discs.

There has been described an analogue indicating device for the direct optical indication of binary encoded values received, which contains a number of $n$ consecutively arranged slotted discs corresponding to the number of the binary digits, said discs can have two different positions. The encoding is determined by the succession "slot and no-slot (disc substance)" and "no-slot—slot" in the indicating fields, for example, to the first succession the binary digit 0 and to the second one the binary digit 1 may be associated. The slots are now arranged in such a way that each slotted disc contains one code gap, while the code line is obtained by the successively arranged slotted discs. An indicating device equipped with such code discs may, inter alia, be used for the representation of angular values, if the code discs are circular. The slots need then only to be of such a size to cover a small zone at the circumference of the slotted disc. But it may also be necessary and suitable to represent full radii or diameters with the code discs. For that purpose it is only required to provide slots from the periphery of the code discs to the centre. A simple deliberation, however, reveals that it is impossible from the technical point of view to provide slots from the circumference towards the centre of the circular discs, if a larger quantity of slots must be provided, e.g. if the code comprises a larger number of digits.

It is therefore proposed in accordance with this invention to subdivide the discs into concentric parts or zones the width of which decreases from the circumference towards the centre in the order of the integer power of 2, and to provide slots in the $m$th zone only to a scope corresponding to a code with $(n-m+1)$ digits. So the number of slots decreases towards the centre of the disc, that means the radii and diameters do not consist of coherent lines, but small deviations from the should-be value occur which, however, are constant on their average. On the other hand, it is advantageous for technical reasons not to make the slots coherently but either dotted or dashed.

If lines should now be represented which are longer than the radius or the diameter of the code discs, the code discs may be formed as cone-shaped shutters and the individual cones placed into one another. The light source is then arranged in the centre of the cone, enabling the representation of larger lines.

If three such indicating devices are combined in one arrangement which is supplied with values from three different points, said arrangement can be used for triangulation.

In order to prevent an erroneous indication of the zero value at power failure, and in order to increase the safe transmission it is deemed suitable to provide an additional code disc with regularly arranged "slots" and "no-slots" (substance of disc) the width of which corresponds to the field width. Encoding is made by blocking all even-numbered fields in resting position and all odd-numbered fields in rotated position. The control, e.g. turning of the additional code disc is achieved by a test pulse always added to the transmitted information when the number of binary "ones" is even.

FIG. 5 demonstrates a code disc (11) suitable for a five-digit code. This code disc is associated to the highest binary digit ensuring a uniform distribution of the slots on the upper semi-circle of the disc. Slot distribution on the lower semi-circle is uniform too, but shifted by the "no-slot" width, not shown on the drawing in FIG. 5. As FIG. 5 clearly reveals the width of the outmost zone is half the diameter of the code disc, and each following zone towards the centre is half as wide as the preceding one. In compliance with the invention the number of slots decreases from zone to zone towards the centre in such a way that each zone has half the number of slots than the just preceding one. This corresponds to a code which decreases by one binary digit from zone to zone.

FIG. 6 shows schematically the cone-shaped code discs 12. A luminous line 13 is projected onto the base 14 by the light source 15, said line being longer than the radius of the code disc. If three such indicating devices M1 . . . M3 are arranged as shown in FIG. 7, the three luminous lines produced may be used for triangulation. The indicating devices are then operated as known in the engineering art on the subject. The beacon equipment for each indicating device M1 . . . M3 and the means for rotating the cone discs may be similar to that shown in the Sunnen patent application.

FIG. 8 schematically shows the rotatable code discs 16 and the stationary disc 17 in an indicating device according to the British application. The code disc 17 has an equal subdivision into "slots and no-slots." The additional code disc 18 also possesses an equal distribution of "slots and no-slots" which, however, are of twice the width and comprise a whole indication field. Code disc 18 can have two different positions like the code discs 16. FIG. 8 displays the resting position at which the indication of odd values is possible only. In the left position effected by an impulse transmitted in addition with an information the indication of the even values is obtained, while the odd values are blocked. The additional impulse will always be transmitted as $(n+1)$th digit then, when the number of binary 1 bits is even.

I claim:

1. An analog indicating device for direct optical indication of binary encoded values, comprising a plurality of $n$ slotted discs, means arranging said discs one behind the other, said disc arrangement being capable of two positions 0 and 1 and for indicating $2^n$ sequentially numbered indicating fields, said code slots to represent whole radii or whole diameters being disposed along the radii of said discs, each said disc being subdivided into concentric zones, the width of each zone decreasing towards the center of said disc at the integer power of 2 and in the $m$th zone there are provided slots which correspond to an $n-m+1$ digit code, and means disposing a light source behind said discs whereby the light from said source will provide an indication at any indicating field where the slots from all said discs coincide.

2. An analogue indicating device according to claim 1, wherein the code slots are dotted or dashed.

3. An analogue indicating device according to claim 1, further comprising an additional code disc with a regular distribution of "slots and no-slots," the width of said "slots and no-slots" being equal to the field width, and which are arranged in such a way that in resting position the even-numbered indicating fields are blocked and in rotated position, effected by an impulse which is transmitted together with the even-numbered bits of the information, the odd-numbered indicating fields are blocked.

4. An analogue indicating device according to claim 1, wherein that the code discs are formed as cone-shaped shutters, and that the light source is provided inside the shutters placed into each other.

References Cited by the Examiner

UNITED STATES PATENTS

| 3,094,698 | 6/63 | Sunnen | 343—112 |
| 3,096,444 | 7/63 | Seward | 340—347 X |

LEO SMILOW, *Primary Examiner.*

CHESTER L. JUSTUS, *Examiner.*